(12) United States Patent
Vas et al.

(10) Patent No.: US 11,361,101 B2
(45) Date of Patent: Jun. 14, 2022

(54) MULTI-PARTY AUTHENTICATION AND AUTHORIZATION

(71) Applicant: AirWatch LLC, Atlanta, GA (US)

(72) Inventors: Sachin Vas, Bangalore (IN); Ramani Panchapakesan, Bangalore (IN); Vijaykumar Bhat, Bangalore (IN); Sushilvas Vasavan, Bangalore (IN)

(73) Assignee: AirWatch LLC, Atlanta, GA (US)

( * ) Notice: Subject to any disclaimer, the term of this patent is extended or adjusted under 35 U.S.C. 154(b) by 0 days.

(21) Appl. No.: 16/019,847

(22) Filed: Jun. 27, 2018

(65) Prior Publication Data

US 2018/0307858 A1 Oct. 25, 2018

Related U.S. Application Data

(62) Division of application No. 14/879,114, filed on Oct. 9, 2015, now Pat. No. 10,032,044.

(51) Int. Cl.
| | |
|---|---|
| *G06F 21/62* | (2013.01) |
| *H04L 9/32* | (2006.01) |
| *H04L 9/40* | (2022.01) |
| *G06F 21/40* | (2013.01) |
| *H04W 12/63* | (2021.01) |

(52) U.S. Cl.
CPC .......... *G06F 21/6245* (2013.01); *G06F 21/40* (2013.01); *H04L 9/321* (2013.01); *H04L 63/107* (2013.01); *H04L 63/083* (2013.01); *H04L 63/0823* (2013.01); *H04W 12/63* (2021.01)

(58) Field of Classification Search
CPC ..... G06F 21/12–128; G06F 21/60–645; G06F 21/40; H04L 9/32–3297; H04L 63/10–108; H04L 63/08–0892; H04W 12/63
See application file for complete search history.

(56) References Cited

U.S. PATENT DOCUMENTS

| | | | |
|---|---|---|---|
| 9,378,386 B1* | 6/2016 | Saylor | G06F 21/6245 |
| 9,542,540 B2 | 1/2017 | Hotes et al. | |
| 9,876,788 B1* | 1/2018 | Ziraknejad | G06F 21/45 |
| 2007/0255943 A1 | 11/2007 | Kern et al. | |
| 2008/0133930 A1 | 6/2008 | Moshir et al. | |
| 2011/0040967 A1* | 2/2011 | Waller | G06F 21/10 |
| | | | 713/161 |
| 2014/0289833 A1* | 9/2014 | Briceno | H04L 63/205 |
| | | | 726/5 |
| 2015/0106897 A1 | 4/2015 | Davis et al. | |
| 2015/0220931 A1 | 8/2015 | Alsina et al. | |
| 2015/0363607 A1* | 12/2015 | Yang | H04L 63/062 |
| | | | 713/165 |
| 2016/0078203 A1 | 3/2016 | Moloian et al. | |
| 2016/0140296 A1 | 5/2016 | Quinn et al. | |

* cited by examiner

*Primary Examiner* — Madhuri R Herzog
(74) *Attorney, Agent, or Firm* — Thomas | Horstemeyer, LLP

(57) ABSTRACT

Disclosed are various examples for multi-party authentication and authentication. In one example, a user can gain access to secured data stored by a managed device based on the presence of the minimum quantity of other users within a threshold proximity of the user who desires access.

20 Claims, 8 Drawing Sheets

MULTI-PARTY AUTHENTICATION AND AUTHORIZATION

CROSS-REFERENCE TO RELATED APPLICATIONS

This application is a division of, and claims priority to, co-pending U.S. patent application Ser. No. 14/879,114, entitled "Multi-Party Authentication and Authorization," and filed on Oct. 9, 2015, which is incorporated herein by reference in its entirety.

BACKGROUND

Authentication of users is important to maintain data security and access control. In some cases, important files can be securely stored upon a client device, with access to the files being controlled by a management agent. For example, the files can be encrypted such that they can be accessed only through the management agent. Consequently, if the client device is lost or stolen, the files are protected against access by unauthorized users. Typically, a user will provide a username and a password or other security credential to the management agent. The management agent will then contact an authentication server, which determines whether the user is authorized to access the file based upon the username and the password. If the user forgets the password, the user can request a password reset through the server.

In various scenarios, the client device can lack network connectivity to the authentication server. In the scenarios, the management agent can be equipped to authenticate the user in an off-line mode based on his or her username and password. However, if the user forgets his password, no recovery mechanism allows the user to access the secured files while in the off-line mode.

In other scenarios, the files can be of such an importance to an organization that the organization is reluctant to allow the files to be placed on individual client devices for access by the devices' respective users, even if the users are individually authenticated. For example, the authenticated users can use the content of the files toward a malicious end, or the authenticated users can unknowingly use the files in such a manner that the content can be disclosed to unauthorized parties in the vicinity.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Authentication and authorization by multiple parties can be desirable to assure an appropriate level of security for data of an organization. As will be discussed, multi-party authorization can be employed to allow a user to access secured data when he or she is unable to authenticate, for example, as a result of forgetting a password or other security credential. Further, multi-party authorization can be employed to add another level of security for highly sensitive documents. In various scenarios, multi-party authentication and authorization can be performed with communication and authorization mediated by a management server, or multi-party authentication and authorization can be performed on a peer-to-peer basis, with communication directly between client devices.

Figure 1:
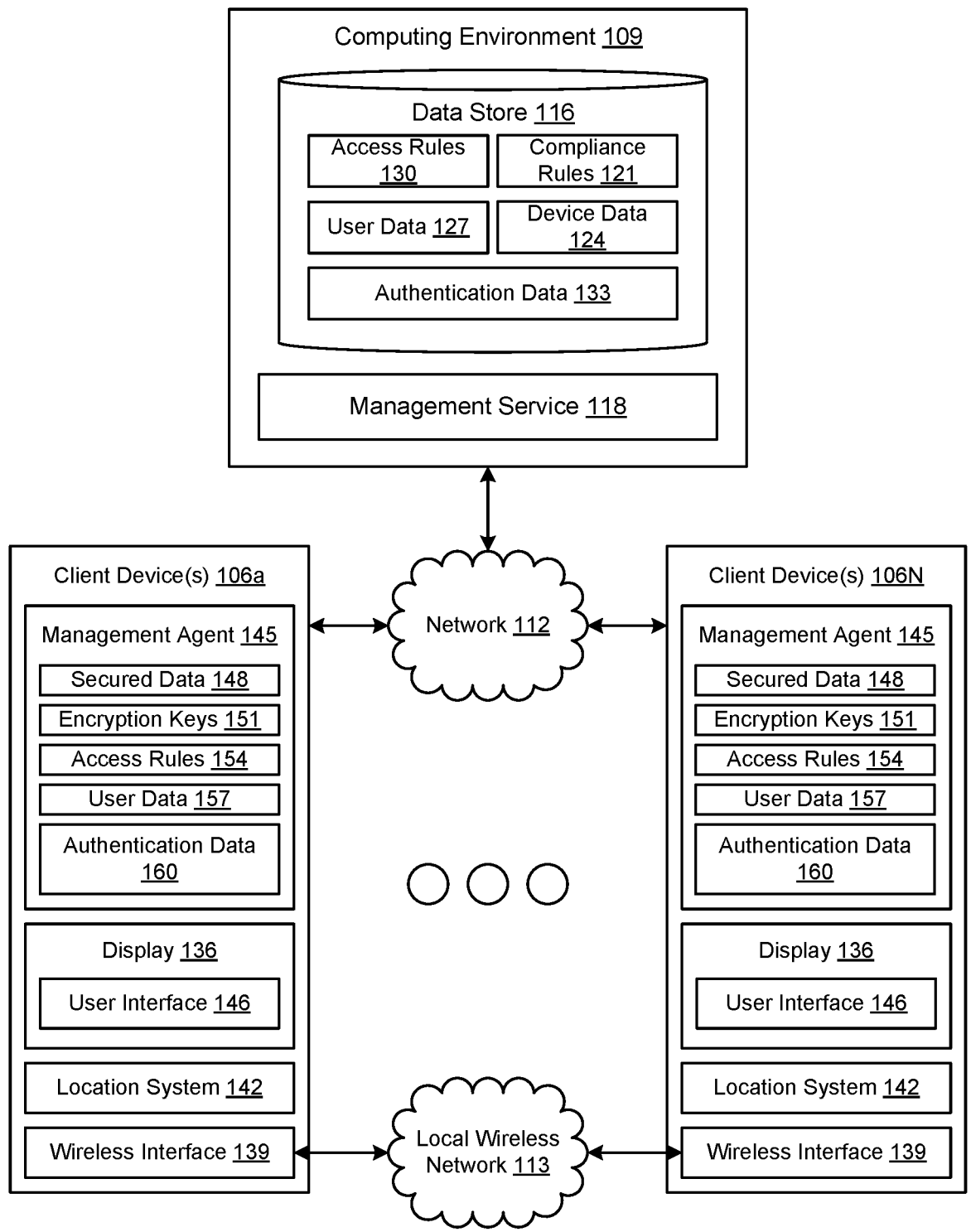
FIG. 1 is a drawing of a networked environment according to various examples of the disclosure.

With reference to FIG. 1, shown is a networked environment 100 according to various examples. The networked environment 100 includes a plurality of client devices 106a . . . 106N and a computing environment 109, which can be in data communication with one another over the network 112. The network 112 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks. In addition, two or more of the client devices 106 can be in data communication with one another over a local wireless network 113.

The computing environment 109 can include, for example, a server computer or any other system providing computing capabilities. Alternatively, the computing environment 109 can employ multiple computing devices that can be arranged, for example, in one or more server banks, computer banks, or other arrangements. The computing devices can be located in a single installation or can be distributed among many different geographical locations. For example, the computing environment 109 can include multiple computing devices that together form a hosted computing resource, a grid computing resource, or any other distributed computing arrangement. In some cases, the computing environment 109 can operate as at least a portion of an elastic computing resource where the allotted capacity of processing, network, storage, or other computing-related resources can vary over time. The computing environment 109 can also include or be operated as one or more virtualized computer instances. Generally, the computing environment 109 can be operated in accordance with particular security protocols such that they are considered trusted computing environments. The data stored in the data store 116 is associated with the operation of the various components described below.

The computing environment 109 can execute a management service 118 or other systems. The management service 118 can manage or oversee the operation of multiple client devices 106. In some examples, an enterprise, such as one or more companies or other organizations, can operate the management service 118 to oversee or manage the operation of the client devices 106 of employees, contractors, or other users within an enterprise environment. In this sense, the client devices 106 are managed devices that are managed by the management service 118.

To facilitate management of client devices 106, the management service 118 can establish a communication channel with the client devices 106. The client device 106 can be enrolled as a managed device with the management service 118 through application programming interfaces (APIs) provided by the operating system. The enrollment process can include installing an MDM profile in a profile store of the operating system, which grants the management service 118 permission to call restricted APIs, thereby causing MDM actions to be performed.

Examples of management functions can include commands to erase certain data from the client device 106, commands to install certain applications or application updates, commands to lock a client device 106 or activate a display lock feature, a command to remotely perform a factory reset of the client device 106, or other management functions. Additionally, data can be securely transmitted through the communication channel to the client device 106 or applications executed by the client device 106.

Additionally, the operating system of the client device 106 can also provide the ability to create access-restricted storage that is associated with particular applications installed on the client device 106. Access-restricted storage can be associated with multiple applications that are installed on the client device 106. In some scenarios, applications that are signed by a common certificate can be provided access to the access-restricted storage of each other, whereas applications that are not signed by the certificate do not have access to the access-restricted storage of other applications. Additionally, the management service 118 can transmit data to the client device 106 over the communication channel that can be stored in the access-restricted storage such that it is accessible by certain applications and inaccessible to other applications that are installed on the client device 106.

The communication channel can be encrypted or secured using a digital certificate that is associated with the client device 106, the management service 118 or an enterprise with which the client device 106 is associated. In one scenario, the management service 118 can obtain a security certificate, such as a secure sockets layer (SSL) certificate, that is unique to a particular enterprise with which a client device 106 is associated. In one example, an administrator associated with the enterprise can provide a certificate to the management service 118 using an administrator console or other functionality with which a certificate can be uploaded. The certificate can also be signed by a certificate authority. The management service 118 can encrypt or secure the communication channel using the certificate so that the communication channel is a secure communication link over the network 112 through which data can be sent to the client device 106.

Additionally, the management service 118 can specify that data sent through the communication channel can only be accessed by certain applications installed on the client device 106. The applications that can access data sent through the communication channel can also be restricted in how certain data can be manipulated, viewed or handled on the client device 106. For example, an application installed on the client device 106 can be coded to restrict the ability of a user to capture, share, or otherwise remove data from the client device 106 that is received through the communication channel.

In contrast, communication links involving short message service (SMS) messages, email, and other forms of communication can be prone to data leakage. For example, a SMS message sent to a client device 106 can be accessed by other applications installed on the client device 106 that have authority to access a SMS inbox of the client device 106. Additionally, a user of the client device 106 can have the ability to screen capture, copy, paste, forward, or otherwise capture and retransmit the contents of SMS messages. Email is also similarly prone to data leakage. A user can capture and retransmit the contents of email messages. Additionally, email messages are often accessible by devices other than the client device 106. These other devices may not be managed by the management service 118.

The management service 118 can also facilitate ensuring that client devices 106 that are administered by the management service 118 are operating in compliance with various compliance rules. In one scenario, the management service 118 can issue management commands that instruct a client device 106 to take a particular action with respect to a compliance rule. For example, if a client device 106 is designated as lost or stolen, the management service 118 can issue a command instructing the client device 106 to erase data and applications that were previously sent to the client device 106 through the communication channel or other communication links and otherwise stored on the client device 106. As another example, if the management service 118 determines that a client device 106 has violated a compliance rule with respect to having unauthorized modifications or unauthorized applications installed on the client device 106, the management service 118 can issue a command instructing the client device 106 to erase data and applications that were previously sent to the client device 106 through the communication channel or other communication links and otherwise stored on the client device 106. As another example, the management service 118 can also issue a command instructing the client device 106 to activate a display lock of the client device 106 that requires a user to enter a PIN in order to use the client device 106. The management service 118 can also transmit data obtained from other sources to the client device 106 through the communication channel.

The data stored in the data store 116 includes, for example, compliance rules 121, device data 124, user data 127, access rules 130, authentication data 133, and potentially other data. Within the context of an enterprise, compliance rules 121 include one or more rules that, when violated, can cause the management service 118 to issue a management command or otherwise cause a management command to be executed locally on the client device 106. Compliance rules 121 can include a list of unauthorized hardware functions, software functions, or applications that potentially pose a threat to enterprise data or use of enterprise applications. As noted above, if client device 106 falls out of compliance with one or more compliance rules 121, a management command can be transmitted to the client device 106 instructing the client device 106 to perform one or more actions specified by the compliance rule 121.

Device data 124 can represent data stored in the data store 116 that is associated with client devices 106 that are enrolled with the management service 118 as managed devices. Device data 124 can include a unique device identifier associated with the client device 106, device policies that are associated with a particular client device 106, status information associated with a particular client device 106, and other data that facilitates management of the client device 106 by the management service 118.

The data store 116 can also include user data 127, such as email, contacts, calendar data, documents, files or other data that is associated with a user account. A user account can be associated with multiple client devices 106. Different client devices 106 associated with a user account can have different user data 127 stored thereon. For example, a user's smartphone can have a certain number of documents or email messages stored on the device, whereas the user's laptop or tablet can have varying amounts of types of user data 127 stored on the device.

The access rules 130 can establish parameters for accessing protected data, such as portions of the user data 127 that are deemed sensitive. In one scenario, an access rule 130 can require that a certain number of other users approve a request by a user to access a protected file. In another scenario, an access rule 130 can require, for accountability purposes, that a certain number of other users be in the vicinity of a user who is accessing a protected file. The access rules 130 can also define procedures by which users can gain access to protected data if they forget their security credentials or are otherwise unable to authenticate themselves.

The authentication data 133 represents data associated with authentication requests that are facilitated by the management service 118. An authentication request can be generated on behalf of a user attempting to access a resource through the management service 118 or any other service executed by the computing environment 109. An authentication request can also be associated with an attempt to access a third party mail service, web service, or any other service for which authentication is required by a user. Authentication data 133 can represent data related to authentication credentials of a particular user account. For example, a service can employ two-factor authentication in order to authenticate a user. In this scenario, the authentication data 133 can represent a password, passphrase, or other form of secret that is used to seed a one-time password algorithm.

The client devices 106 are representative of one or more devices that can be associated with a user or enterprise that can be enrolled with the management service 118 as a managed device. As noted above, a communication channel can be established between the client device 106 and the management service 118 to facilitate secured and encrypted communications between the management service 118 and client device 106. The client device 106 can also execute an operating system that provides MDM APIs that facilitate creation of the communication channel and management of the client device 106 by the management service 118. For example, the MDM APIs provided by the operating system of the client device 106 can facilitate execution of commands generated by the management service 118 and sent to the client device 106 over the communication channel.

The client device 106 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 106 can include a display 136 that comprises, for example, one or more devices such as liquid crystal display (LCD) displays or other types of display devices.

The client device 106 can also be equipped with networking capability or networking interfaces, including a localized networking or communication capability such as an NFC capability, RFID read and/or write capability, a microphone and/or speaker, or other localized communication capability. In particular, the client device 106 can include a wireless interface 139 that facilitates communication between the client devices 106 using the local wireless network 113. The client device 106 can also include a location system 142 that enables the client device 106 to ascertain its location. The location system 142 can correspond to a global positioning system (GPS) device, or a system that enables location determination by triangulation with respect to known cell towers, wireless local area network access points, and so on.

The client device 106 can be configured to execute various applications, such as a management agent 145 and other applications, services, or processes. The management agent 145 can monitor or manage at least a portion of the data, applications, or hardware components for the client device 106. One function of the management agent 145 can be to authenticate the user in order to provide the user with access to secured data either stored locally in the client device 106 or obtainable over the network 112 from the management service 118 or other remote data storage. In authenticating the user, the management agent 145 can be configured to render one or more user interfaces 146 upon the display 136 of the client device 106. In some cases, the management agent 145 can correspond to a standalone application or to browser-executed code controlled by the management service 118.

The management agent 145 can also identify whether the client device 106 is operating in accordance with the compliance rules 121 that have been assigned to the client device 106. In some examples, the management agent 145 can function as a portion of an operating system for the client device 106. In other examples, the management agent 145 can function in the application layer of the client device 106. Alternatively, the management agent 145 can be a portion of an application that was developed, for example, using a Software Development Kit (SDK) that facilitates the inclusion of functionality within the application that monitors or manages at least a portion of the resources for the client device 106.

The management agent 145 can be executed by the client device 106 automatically upon startup of the client device 106. Additionally, the management agent 145 can run as a background process in the client device 106. Accordingly, the management agent 145 can execute without user intervention in some examples. Additionally, the management agent 145 can communicate with the management service 118 in order to facilitate management of the client device 106 and enforcement of compliance rules 121.

For example, the management agent 145 can obtain compliance rules 121 from the management service 118, and the management agent 145 can determine whether the client device 106 is operating in accordance with those compliance rules 121. In another example, the management agent 145 transmits data that indicates the status of the client device 106 to the management service 118, and the management service 118 uses this data to determine whether the client device 106 is operating in accordance with compliance rules 121. If it is determined that the client device 106 is not in compliance with one or more compliance rules 121, the management agent 145 or the management service 118 initiates a remedial action. The management agent 145 can also execute commands to erase applications or data stored by applications from the client device 106 that are received from the management service 118.

The management agent 145 can store or have access to various data in the client device 106. For example, the data stored in the client device 106 can include secured data 148, encryption keys 151, access rules 154, user data 157, authentication data 160, and/or other data. The secured data 148 corresponds to a protected portion of the user data 157 for which special multi-user authentication procedures can be required in some scenarios. In particular, the secured data 148 can be encrypted using the encryption keys 151. The encryption keys 151 can correspond to public keys, private keys, symmetric keys, and/or other forms of keys, where access to the encryption keys 151 is controlled by the management agent 145. The access rules 154 can include access rules 130 stored upon the client device 106 and used to control access to the secured data 148 in particular when access by the client device 106 to the network 112 or to the management service 118 is unavailable.

The user data 157 can include various types of user data 127 that are stored locally in the client device 106. For example, the user data 157 can include email, contacts, calendar data, documents, files or other data. The authentication data 160 represents data associated with authentication requests that are facilitated by the management agent 145. The authentication data 160 can be a subset of the authentication data 133 that is stored by the client device 106. An authentication request can be generated on behalf of a user attempting to access a resource through the management agent 145. An authentication request can also be associated with an attempt to access a third party mail service, web service, or any other service for which authentication is required by a user. Authentication data 160 can represent data related to authentication credentials of a particular user account. For example, a service can employ two-factor authentication in order to authenticate a user. In this scenario, the authentication data 160 can represent a password, passphrase, or other form of secret that is used to seed a one-time password algorithm.

Figure 2A:
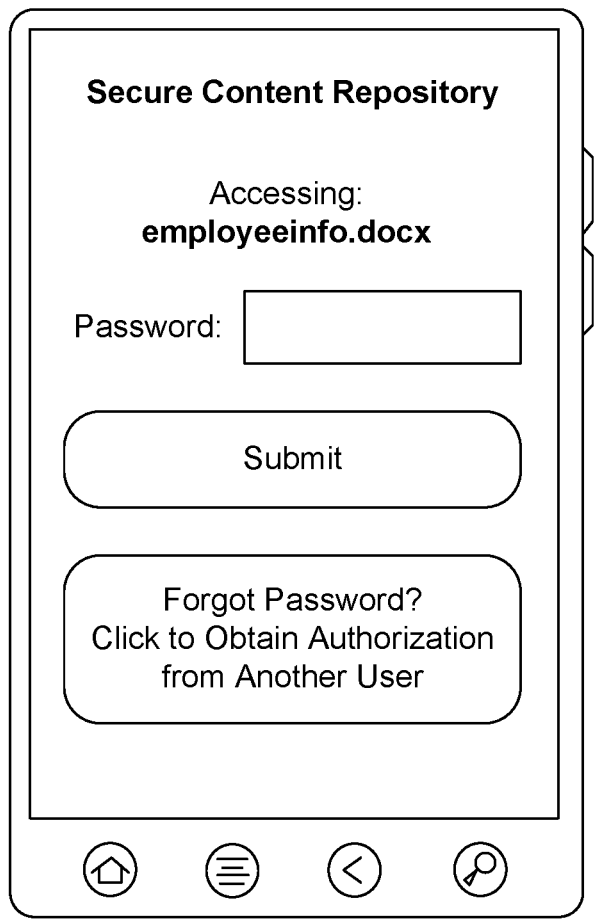
FIGS. 2A-2C are drawings of user interfaces shown on client devices according to various examples of the present disclosure.

Turning now to FIG. 2A, shown is a drawing of a user interface 146a rendered upon a client device 106 according to various examples. In the user interface 146a, a user has requested access to a particular file ("employeeinfo.docx") that is stored in the secured data 148 managed by the management agent 145. The user interface 146a requests that the user enter a security credential (here, a password) in order to gain access to the file. For example, the file can be encrypted by an encryption key 151 and decrypted only in response to the user entering the correct security credential.

However, according to examples of the present disclosure, if a user is unable to provide the security credential (for example, the user forgets the password), he or she can select a user interface component in order to request authorization from other users. In this example, the user interface component is a button labeled "Forgot Password? Click to Obtain Authorization from Another User." Other labels or component types can be utilized in other examples.

Figure 2B:

Moving on to FIG. 2B, shown is a drawing of a user interface 146b rendered upon a client device 106 according to various examples. In the user interface 146b, a user has requested access to a particular file ("employeeinfo.docx") that is stored in the secured data 148 managed by the management agent 145. The user interface 146a requests that the user enter a security credential (here, a password) in order to gain access to the file. However, unlike the example reflected in user interface 146a of FIG. 2A, authorization from other users is mandatory. Specifically, the user interface 146b informs the user that to access the requested data, approval from two other users will be requested. In other examples, accessing data can require that a certain number of other authenticated users are within a predefined distance of the user, or within a certain geographic area in which the user is located.

Figure 2C:
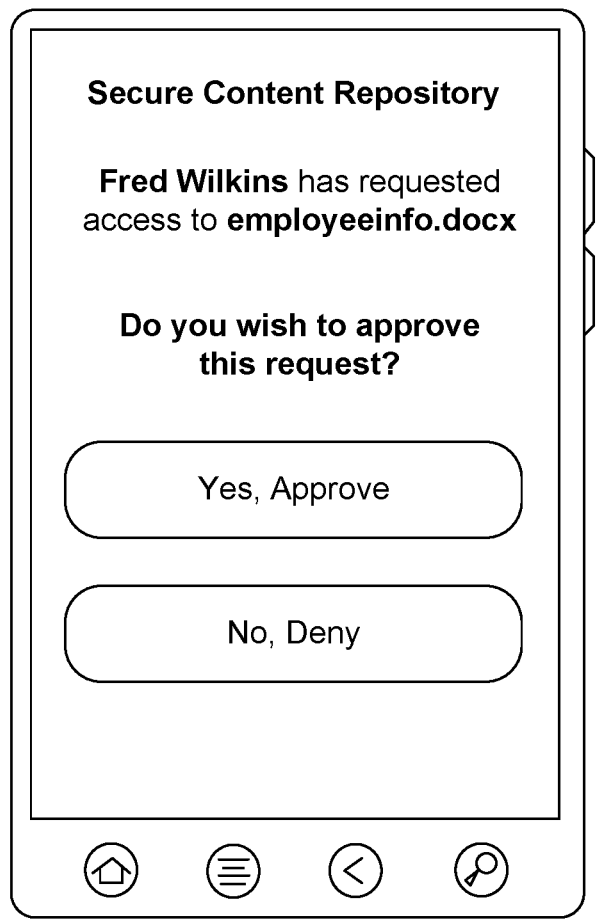

Continuing next to FIG. 2C, shown is a drawing of a user interface 146c rendered upon a client device 106 according to various examples. The user interface 146c corresponds to an authorization interface that enables a user to approve or deny a request by another user to access protected data. In this example, the user interface 146c has two user interface components through which a user can signal approval or denial. Here, these components are represented as buttons labeled, respectively, "Yes, Approve" or "No, Deny." Other components or labels can be used in other examples.

Figure 3:
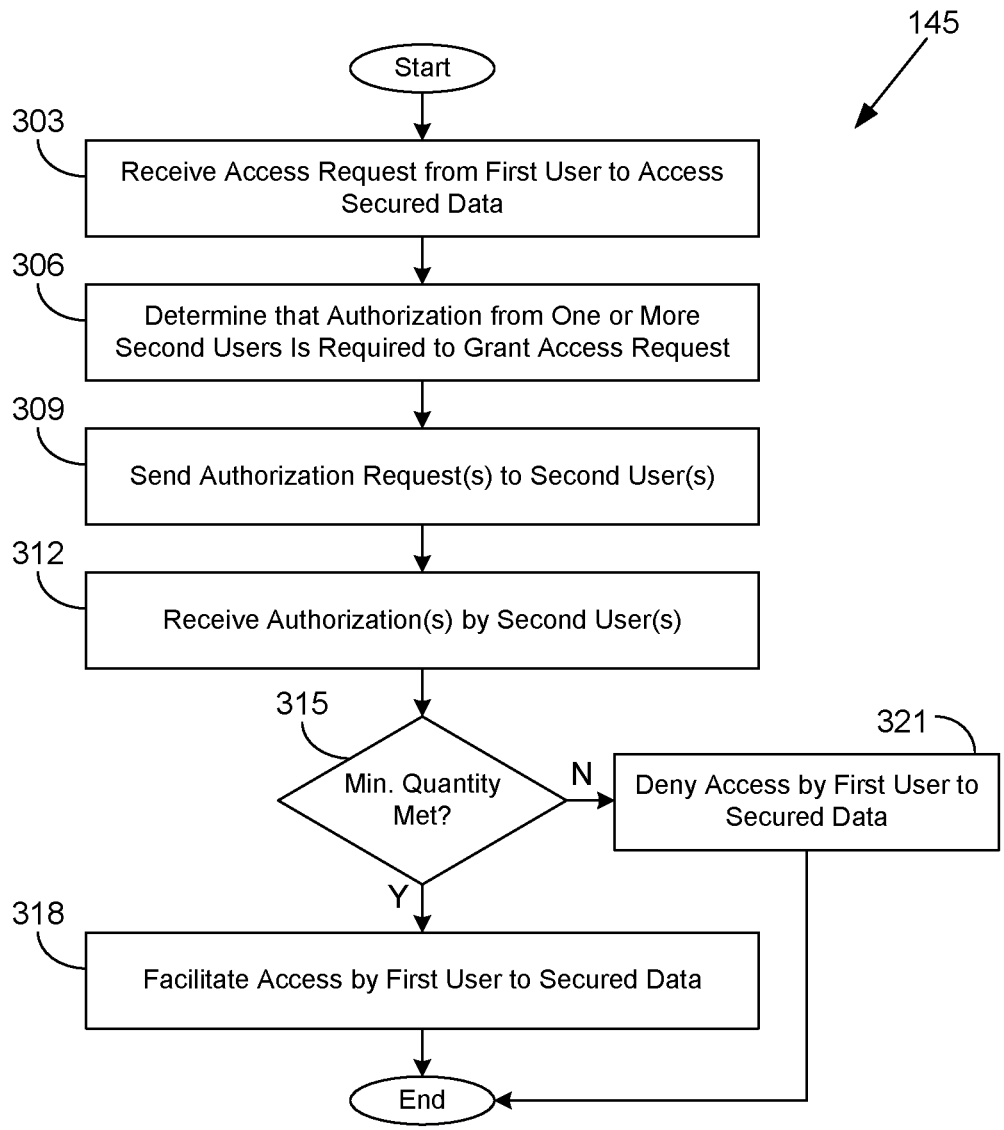
FIGS. 3-6 are flowcharts illustrating examples of functionality according to various examples of the present disclosure.

Referring next to FIG. 3, shown is a flowchart that provides one example of the operation of the management agent 145. Functionality attributed to the management agent 145 can be implemented in a single process or application executed by the client device 106 or in multiple processes or applications. The separation or segmentation of functionality as discussed herein is presented for illustrative purposes only. In some implementations, portions of the functionality attributed to the management agent 145 can be performed by the management service 118 executed in the computing environment 109.

Beginning with step 303, the management agent 145 receives an access request from a first user to access secured data 148. For example, the first user can request to access a file or other data that is protected by the management agent 145. The file or other data can be stored by the client device 106 in an encrypted form. Alternatively, the file or other data can be obtained from the management service 118. In one implementation, the access request corresponds to an SMS text message generated by the management agent 145. The access request can include information such as a user name, a device identifier, an encrypted token generated by the management agent 145, and/or other information.

At step 306, the management agent 145 determines that authorization from one or more second users is required to grant the access request. In one scenario, the authorization from the second user(s) can be required because the first user has entered an incorrect security credential or otherwise has indicated that a required security credential cannot be provided. In another scenario, the first user enters the required security credential, but the management agent 145 determines that authorization from the second user(s) is still required. For example, the requested data can be of a sufficient importance that authorization from multiple users is necessary. The management agent 145 can make the determination as to whether multiple party authorization is required with respect to the access rules 154.

At step 309, the management agent 145 sends authorization requests to one or more second users. The second users can be identified according to an explicit designation of the specific second users in the access rules 154 or the access rules 130. Alternatively, the second users can be identified according to a group in which they are members or a role in an organization that they currently fulfill, again as specified in the access rules 154 or the access rules 130. In one example, the second users can correspond to information technology administrators who are designated to approve these requests. The authorization requests can be sent over the local wireless network 113 or the network 112. The authorization requests can be sent directly from one management agent 145 to another management agent 145 in a peer-to-peer arrangement. Alternatively, the management service 118 can send the authorization requests to the individual management agents 145. The authorization requests can correspond to text messages in some implementations. For example, a token value can be embedded in the text message, where a return of the token value by way of a uniform resource locator (URL) or in another text message can be used to confirm authenticity of the authorization.

At step 312, the management agent 145 can receive authorizations (and/or denials) from the second users. Alternatively, the management service 118 can receive the authorizations and/or denials from the management agents 145. In various implementations, the absence of an explicit authorization can be considered either an implicit authorization or an implicit denial.

At step 315, the management agent 145 determines whether a minimum quantity of authorizations has been received. For example, an access rule 154 can specify that the approval of one, two, or some other number of other users is required. The minimum quantity can be fewer than the total number of second users from whom the authorization has been requested. Alternatively, the minimum quantity can be all of the second users from whom the authorization has been requested.

If at least the minimum quantity of authorizations has been received, the management agent 145 moves from step 315 to step 318 and can facilitate access to the requested secured data 148 by the first user. In this regard, the management agent 145 can request the secured data 148 from the computing environment 109 or can utilize encryption keys 151 to decrypt the secured data 148 stored in the client device 106. Thereafter, the process proceeds to completion.

If the minimum quantity of authorizations has not been received, the management agent 145 continues instead from step 315 to step 321 and denies access by the first user to the requested secured data 148. Thereafter, the process proceeds to completion.

Figure 4:
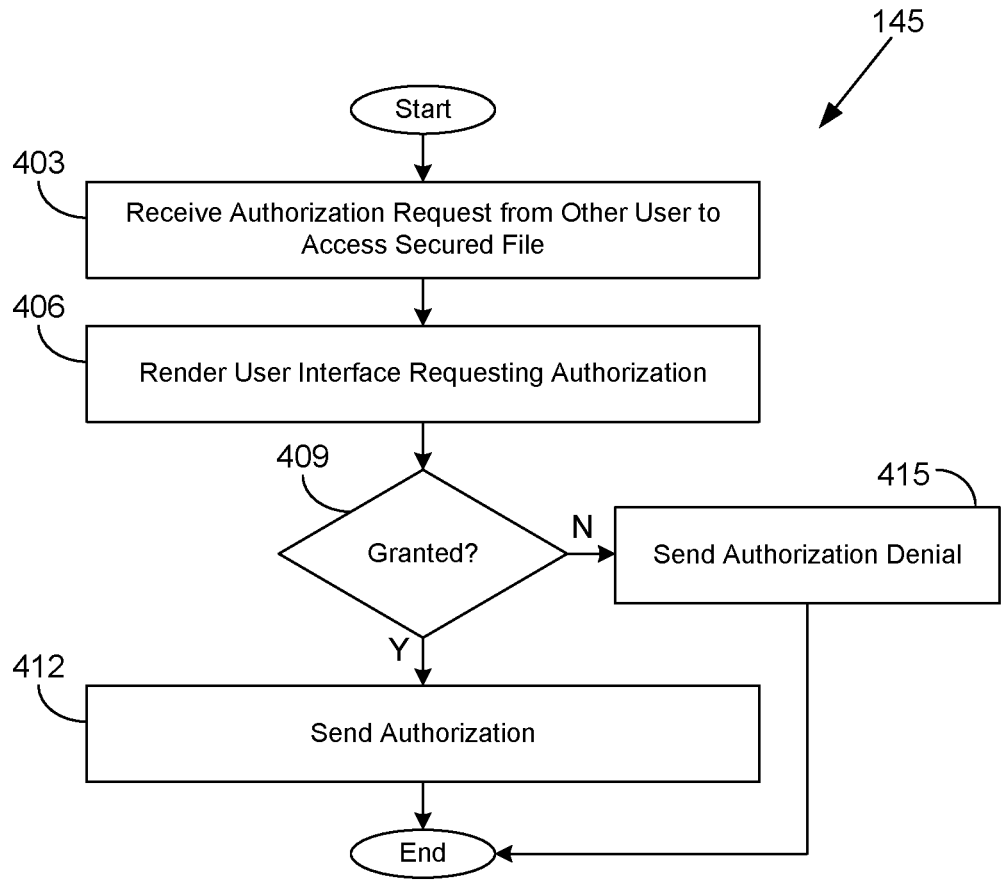

Moving now to FIG. 4, shown is a flowchart that provides another example of the operation of the management agent 145. Functionality attributed to the management agent 145 can be implemented in a single process or application executed by the client device 106 or in multiple processes or applications. The separation or segmentation of functionality as discussed herein is presented for illustrative purposes only. In some implementations, portions of the functionality attributed to the management agent 145 can be performed by the management service 118 executed in the computing environment 109.

Beginning with step 403, the management agent 145 receives an authorization request originating from another user in order to access secured data 148. The management agent 145 can receive the authorization request directly from another management agent 145 in a peer-to-peer type of communication, or the authorization request can be delivered by the management service 118.

At step 406, the management agent 145 renders a user interface 146 requesting authorization. For example, a user interface 146c can be rendered upon a display 136. The user interface 146 can include various details about the authorization request, such as the identity of the user, the type of data that the user is requesting, the location of the client device 106, and so on. The user interface 146 can include components that, when selected, cause the authorization to be granted or denied. In some cases, granting the authorization can involve authenticating the authorizing user by requesting a password, for example. In one example, the authorization request can be sent to the client device 106 embodied in a text message.

At step 409, the management agent 145 determines whether the user has granted or denied the request. If the user has authorized the request, the management agent 145 proceeds from step 409 to step 412 and sends an authorization. The authorization can be sent directly to the management agent 145 of the user requesting authorization or can be sent to the management service 118. In one example, sending the authorization can correspond to sending a text message from the client device 106. Thereafter, the process proceeds to completion.

If the user has denied the request or has otherwise not granted the request, the management agent 145 instead transitions from step 409 to step 415 and sends a denial of the authorization. This can correspond to sending a text message in one example. In some cases, user inaction can result in no response being sent. Thereafter, the process proceeds to completion.

Figure 5:
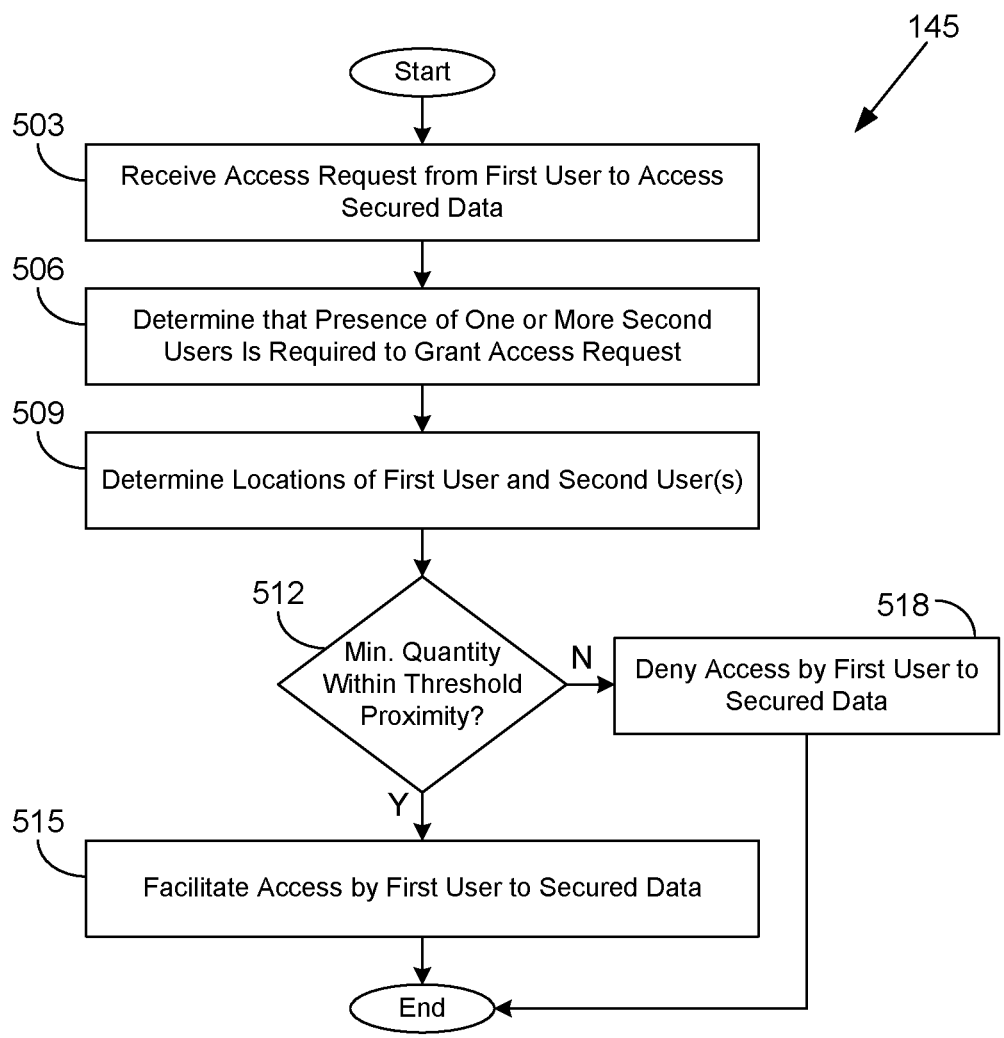

Referring next to FIG. 5, shown is a flowchart that provides another example of the operation of the management agent 145. Functionality attributed to the management agent 145 can be implemented in a single process or application executed by the client device 106 or in multiple processes or applications. The separation or segmentation of functionality as discussed herein is presented for illustrative purposes only. In some implementations, portions of the functionality attributed to the management agent 145 can be performed by the management service 118 executed in the computing environment 109.

Beginning with step 503, the management agent 145 receives an access request from a first user to access secured data 148. For example, the first user can request to access a file or other data that is protected by the management agent 145. The file or other data can be stored by the client device 106 in an encrypted form. Alternatively, the file or other data can be obtained from the management service 118.

At step 506, the management agent 145 determines that the presence of one or more second users is required to grant the request. In one scenario, the presence of the second user(s) can be required because the first user has entered an incorrect security credential or otherwise has indicated that a required security credential cannot be provided. In another scenario, the first user enters the required security credential, but the management agent 145 determines that the presence of the second user(s) is still required. For example, the requested data can be of a sufficient importance that the presence of multiple users in the vicinity is deemed necessary. The management agent 145 can make the determination as to whether the presence of multiple parties is required with respect to the access rules 154.

At step 509, the management agent 145 determines respective locations of the first user and the second users. In this regard, the location systems 142 of the respective client devices 106 can report their respective locations to each other as in a peer-to-peer arrangement or can report their respective locations to the management service 118 for reconciliation. At step 512, the management agent 145 determines whether a minimum quantity of the second users are within a threshold proximity of the first user according to the determined locations. For example, the locations of the respective client devices 106 can be compared, and the distances between the client device 106 of the first user and the client devices 106 of the second users can be computed. In various examples, an access rule 154 can specify that the first user and the second users are required to be in the same room, on the same floor, in the same building, within a five-mile radius, or meet other presence criteria. If at least the minimum quantity of the second users are within the threshold proximity of the first user, the management agent 145 continues from step 512 to step 515 and facilitates access by the first user to the secured data 148. Thereafter, the process proceeds to completion.

If, instead, the management agent 145 determines that the minimum quantity of the second users are not within the threshold proximity, the management agent 145 moves from step 512 to step 518 and denies access by the first user to the secured data 148. Thereafter, the process proceeds to completion.

Figure 6:
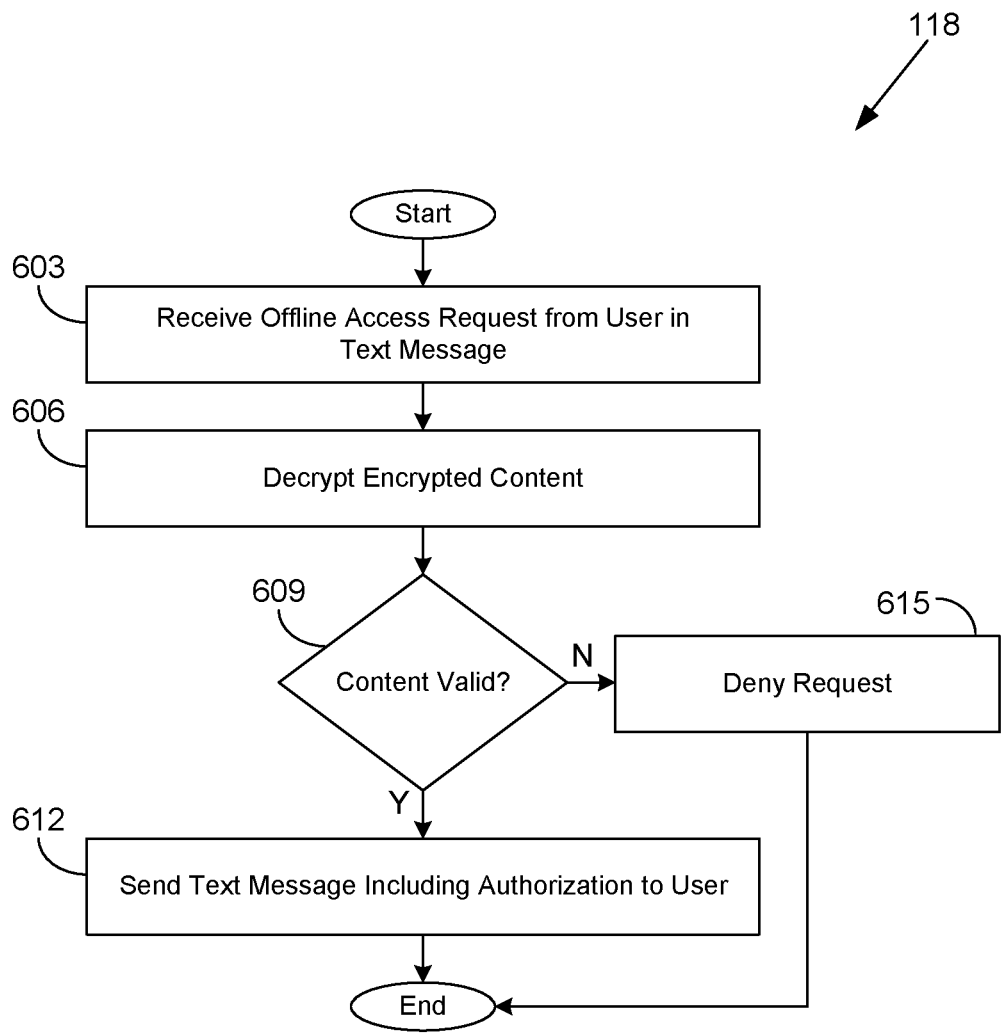

Moving on to FIG. 6, shown is a flowchart that provides one example of the operation of the management service 118. Functionality attributed to the management service 118 can be implemented in a single process or application executed by the client device 106 or in multiple processes or applications. The separation or segmentation of functionality as discussed herein is presented for illustrative purposes only.

Beginning with step 603, the management service 118 receives an offline access request from a user in a text message. The text message can include information such as user name, device identifier, a token generated by the management agent 145 in an encrypted format, and/or other data. At step 606, the management service 118 decrypts the encrypted content of the text message. At step 609, the management service 118 determines whether the content of the text message is valid. In other words, the management service 118 authenticates whether the text message corresponds to a valid user offline access request.

If the content is valid, the management service 118 continues from step 609 to step 612 and sends a text message to the management agent 145 associated with the user. For example, the text message can include a newly generated token along with a user name and device identifier in an encrypted format. This content can be embedded in a custom uniform resource locator (URL). The user can then launch the URL, which will then pass the encrypted content to the management agent 145. The management agent 145 can validate the token and give the user access to offline content stored by the management agent 145. In some cases, the management agent 145 can be configured to allow the user to change his or her password once authenticated by this approach. Thereafter, the process proceeds to completion.

If the content is not valid, the management service 118 moves from step 609 to step 615 and denies the offline access request. A denial text message can be returned to the user at the client device 106. Thereafter, the process proceeds to completion.

The flowcharts of FIGS. 3-6 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 106, computing environment 109, or other components described herein can include at least one processing circuit. The processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the management service 118, the management agent 145, and/or other components can be stored in one or more storage devices and be executable by one or more processors. Also, a data store, such as the data store 116 can be stored in the one or more storage devices.

The management service 118, the management agent 145, or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A method, comprising:
    receiving an access request from a first user to access secured data stored in an encrypted state on a first computing device;
    receiving a security credential from the first user;
    determining that the security credential received from the first user is incorrect;
    in response to determining that the security credential received from the first user is incorrect, determining that access by the first user to the secured data requires that a minimum quantity of a set of second users be within a threshold proximity of the first computing device, wherein the minimum quantity comprises at least two second users;
    determining a location of the first computing device;

determining respective locations of a plurality of second computing devices individually associated with the set of second users;

determining that the minimum quantity of the set of second users are within the threshold proximity based at least in part on the location and the respective locations of the plurality of second computing devices;

decrypting the secured data in response to determining that the minimum quantity of the set of second users are within the threshold proximity; and facilitating access by the first user to the decrypted secured data.

2. The method of claim 1, wherein at least one of the plurality of second computing devices also stores the secured data.

3. The method of claim 1, further comprising communicating with a management server to determine the respective locations of the plurality of second computing devices.

4. The method of claim 1, further comprising communicating directly with the plurality of second computing devices by way of a local wireless connection to determine the respective locations of the plurality of second computing devices.

5. The method of claim 1, wherein the plurality of second computing devices are determined to be within the threshold proximity when direct communication between the first computing device and the plurality of second computing devices by way of a local wireless connection is successful.

6. The method of claim 1, wherein the location of the first computing device is determined using a global positioning system (GPS) device.

7. The method of claim 1, further comprising determining that the secured data is of a sufficient importance in spite of a required security credential being provided by the first user so that access by the first user to the secured data requires that the minimum quantity of the set of second users be within the threshold proximity of the first computing device.

8. A system, comprising:
a first computing device comprising a processor and a memory; and
executable instructions stored by the memory, wherein when executed by the processor causes the first computing device to at least:
receive an access request from a first user to access secured data stored in an encrypted state by the memory;
receive a security credential from the first user;
determine that the security credential received from the first user is incorrect;
in response to determining that the security credential received from the first user is incorrect, determine that access by the first user to the secured data requires that a minimum quantity of a set of second users be within a threshold proximity of the first computing device, wherein the minimum quantity comprises at least two second users;
determine a location of the first computing device;
determine respective locations of a plurality of second computing devices individually associated with the set of second users;
determine that the minimum quantity of the set of second users are within the threshold proximity based at least in part on the location and the respective locations of the plurality of second computing devices;

decrypt the secured data in response to determining that the minimum quantity of the set of second users are within the threshold proximity; and
facilitate access by the first user to the decrypted secured data.

9. The system of claim 8, wherein a memory of at least one of the plurality of second computing devices also stores the secured data.

10. The system of claim 8, wherein the executable instructions, when executed by the processor, further causes the first computing device to at least:
communicate with a management server to determine the respective locations of the plurality of second computing devices.

11. The system of claim 8, wherein the executable instructions, when executed by the processor, further causes the first computing device to at least:
communicate directly with the plurality of second computing devices by way of a local wireless connection to determine the respective locations of the plurality of second computing devices.

12. The system of claim 8, wherein the plurality of second computing devices are determined to be within the threshold proximity when direct communication between the first computing device and the plurality of second computing devices by way of a local wireless connection is successful.

13. A non-transitory computer-readable medium storing executable instructions that, when executed by a processor of a first computing device, cause the first computing device to at least:
receive an access request from a first user to access secured data stored in an encrypted state by the first computing device;
receive a security credential from the first user;
determine that the security credential received from the first user is incorrect;
in response to determining that the security credential received from the first user is incorrect, determine that access by the first user to the secured data requires that a minimum quantity of a set of second users be within a threshold proximity of the first computing device, wherein the minimum quantity comprises at least two second users;
determine a location of the first computing device;
determine respective locations of a plurality of second computing devices individually associated with the set of second users;
determine that the minimum quantity of the set of second users are within the threshold proximity based at least in part on the location and the respective locations of the plurality of second computing devices;
decrypt the secured data in response to determining that the minimum quantity of the set of second users are within the threshold proximity; and
facilitate access by the first user to the decrypted secured data.

14. The non-transitory computer-readable medium of claim 13, wherein at least one of the plurality of second computing devices also stores the secured data.

15. The non-transitory computer-readable medium of claim 13, wherein the executable instructions, when executed by the processor, further causes the first computing device to at least:
communicate with a management server to determine the respective locations of the plurality of second computing devices.

16. The non-transitory computer-readable medium of claim 13, wherein the executable instructions, when executed by the processor, further causes the first computing device to at least:

communicate directly with the at least one second computing device by way of a local wireless connection to determine the respective locations of the plurality of second computing devices.

17. The non-transitory computer-readable medium of claim 13, wherein the plurality of second computing devices are determined to be within the threshold proximity when direct communication between the first computing device and the plurality of second computing devices by way of a local wireless connection is successful.

18. The method of claim 1, further comprising erasing the decrypted secured data from the first computing device in response to receiving a command from a management service.

19. The method of claim 1, wherein determining that the minimum quantity of the set of second users are within the threshold proximity based at least in part on the location and the respective locations of the plurality of second computing devices further comprises:

determining respective distances between the location and the respective locations of the plurality of second computing devices; and comparing the respective distances to the threshold proximity to determine whether the plurality of second devices are within the threshold proximity.

20. The method of claim 1, wherein determining the respective locations of the plurality of second computing devices further comprises receiving the respective locations reported by the plurality of second computing devices via a peer-to-peer arrangement.

* * * * *

UNITED STATES PATENT AND TRADEMARK OFFICE
CERTIFICATE OF CORRECTION

| | |
|---|---|
| PATENT NO. | : 11,361,101 B2 |
| APPLICATION NO. | : 16/019847 |
| DATED | : June 14, 2022 |
| INVENTOR(S) | : Sachin Vas et al. |

It is certified that error appears in the above-identified patent and that said Letters Patent is hereby corrected as shown below:

On the Title Page

Add:
(30) Foreign Application Priority Data
August 8, 2015 (IN) 4142/CHE/2015

Signed and Sealed this
Twenty-first Day of March, 2023

Katherine Kelly Vidal
*Director of the United States Patent and Trademark Office*